United States Patent
Calabro et al.

(10) Patent No.: US 10,313,049 B2
(45) Date of Patent: Jun. 4, 2019

(54) SIGNAL PROCESSING IN AN OPTICAL RECEIVER

(71) Applicant: Xieon Networks S.à.r.l., Senningerberg (LU)

(72) Inventors: Stefano Calabro, Munich (DE); Bernhard Spinnler, Oberhaching (DE)

(73) Assignee: Xieon Networks S.à.r.l., Luxembourg (LU)

( * ) Notice: Subject to any disclaimer, the term of this patent is extended or adjusted under 35 U.S.C. 154(b) by 0 days.

(21) Appl. No.: 15/578,543

(22) PCT Filed: Jun. 29, 2016

(86) PCT No.: PCT/EP2016/065082
§ 371 (c)(1),
(2) Date: Nov. 30, 2017

(87) PCT Pub. No.: WO2017/012838
PCT Pub. Date: Jan. 26, 2017

(65) Prior Publication Data
US 2018/0159652 A1    Jun. 7, 2018

(30) Foreign Application Priority Data
Jul. 23, 2015 (EP) .................. 15178100

(51) Int. Cl.
*H04J 14/06* (2006.01)
*H04B 10/61* (2013.01)
(Continued)

(52) U.S. Cl.
CPC ......... *H04J 14/06* (2013.01); *H04B 7/0413* (2013.01); *H04B 10/6161* (2013.01);
(Continued)

(58) Field of Classification Search
CPC ... H04J 14/06; H04B 10/6971; H04B 7/0413; H04B 10/6161; H04B 10/6165; H04B 10/6162; H04B 10/2569
(Continued)

(56) References Cited

U.S. PATENT DOCUMENTS 8,948,614 B1 * 2/2015 Schmidt ............... H04B 10/616
398/208
2015/0093119 A1 * 4/2015 Gorshtein .......... H04B 10/2507
398/159

(Continued)

OTHER PUBLICATIONS

Faruk, S. et al.,"Compensation for In-Phase/Quadrature Imbalance in Coherent-Receiver Front End for Optical Quadrature Amplitude Modulation," IEEE Photonics Technology Letters, vol. 5(2): 7800110(2013) 11 pages.

(Continued)

*Primary Examiner* — Juan A Torres
(74) *Attorney, Agent, or Firm* — Nelson Mullins Riley & Scarborough LLP

(57) ABSTRACT

The present invention relates to signal processing in an optical receiver, in particular to equalization performed in coherent optical receivers. A multiple-input multiple-output (MIMO) equalizer receives and equalizes a plurality of real value signals, for example four sampled electrical baseband tributaries (HI, HQ, VI, VQ). The outputs of the multiple-input multiple-output (MIMO) equalizer provide equalized real or imaginary components of complex signals. The complex signals including the real and imaginary components are then each and individually equalized to remove chromatic dispersion.

15 Claims, 6 Drawing Sheets

Figure 1:
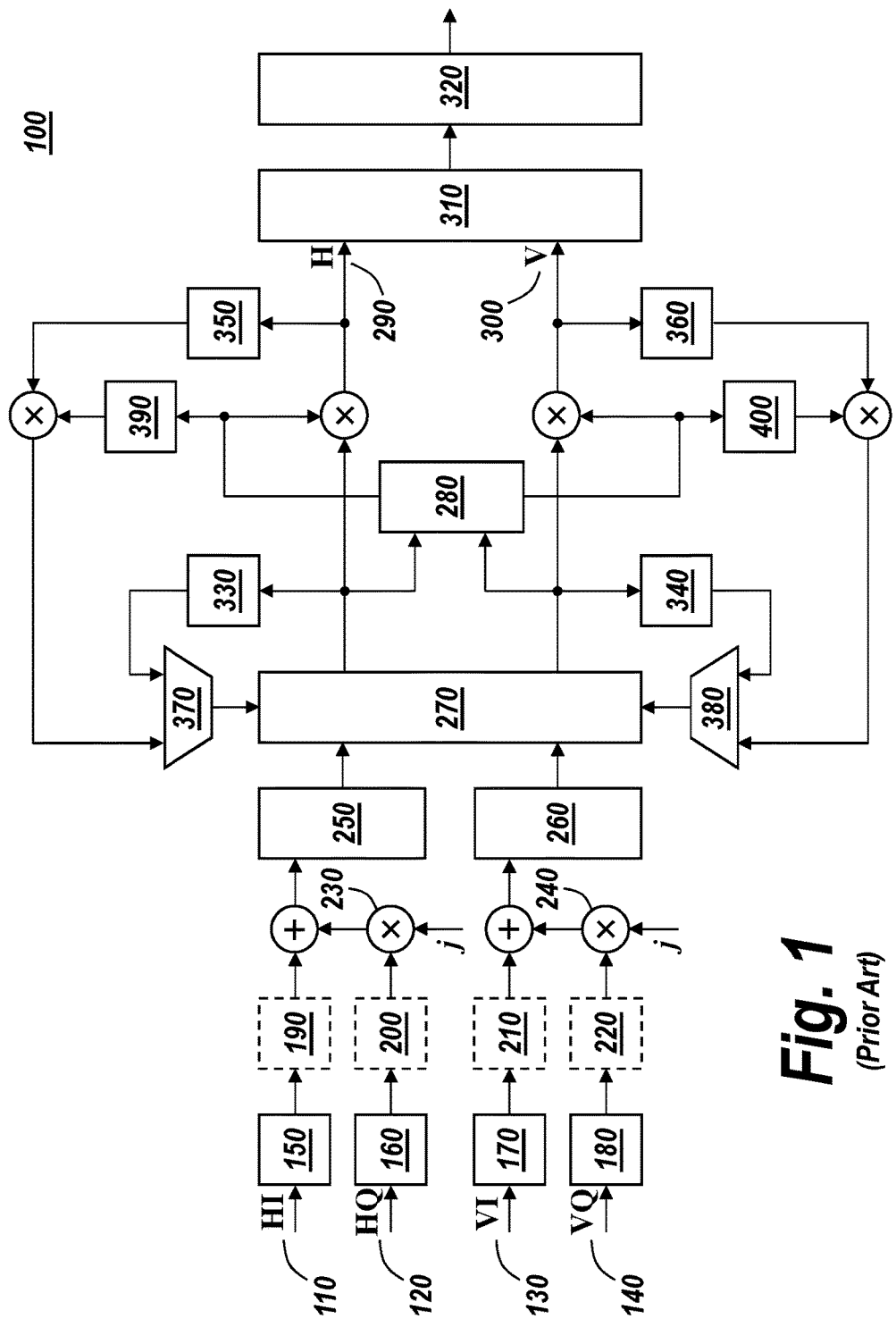

(51) Int. Cl.
   *H04B 7/0413*      (2017.01)
   *H04B 10/69*       (2013.01)
   *H04B 10/2569*     (2013.01)

(52) U.S. Cl.
   CPC ..... *H04B 10/6162* (2013.01); *H04B 10/6165* (2013.01); *H04B 10/6971* (2013.01); *H04B 10/2569* (2013.01)

(58) Field of Classification Search
   USPC .......................................................... 398/65
   See application file for complete search history.

(56) References Cited

U.S. PATENT DOCUMENTS

| | | | | |
|---|---|---|---|---|
| 2015/0365174 | A1* | 12/2015 | Nazarathy | H04L 25/03019 398/209 |
| 2017/0279531 | A1* | 9/2017 | Drummond | H04B 10/25073 |
| 2018/0041287 | A1* | 2/2018 | Agazzi | H04B 10/616 |
| 2018/0205466 | A1* | 7/2018 | Agazzi | H04B 10/616 |

OTHER PUBLICATIONS

Rios-Mueller, R. et al., "Blind Receiver Skew Compensation and Estimation for Long-Haul Non-Dispersion Managed Systems," ECOC 2014, Cannes-France, Th.2.3.1, 3 pages.

Guiomar F. et al., "Reducing the complexity of digital non-linear compensation for high-speed coherent optical communication Systems," Proceedings of Spie, International Society for Optical Engineering, vol. 9286, 9 pages (2014) XP060041054.

International Search Report and Written Opinion, PCT/EP2016/065082, dated Sep. 15, 2016, 12 pages.

Paskov, M. et al., "Blind Equalization of Receiver In-Phase/Quadrature Skew in the Presence of Nyquist Filtering," IEEE Photonics Technology Letters, vol. 25 (24): 2446-2449(2013) XP002752966.

Rios-Mueller, R. et al., "Blind Receiver Skew Compensation and Estimation for Long-Haul N on-Dispersion Managed Systems Using Adaptive Equalizer," Journal of Lightwave Technology, vol. 33 (7): 1315-1318 (2015) XP011575164.

\* cited by examiner

SIGNAL PROCESSING IN AN OPTICAL RECEIVER

CROSS REFERENCE TO RELATED APPLICATIONS

This application is a 35 U.S.C. 371 national stage filing of International Application No. PCT/EP2016/065082, filed on Jun. 29, 2016, which claims priority to European Patent Application No. 15178100.2 filed on Jul. 23, 2015. The contents of the aforementioned applications are hereby incorporated by reference in their entireties.

FIELD OF THE INVENTION

The present invention relates to the field of signal processing in an optical receiver, in particular to equalization performed in coherent optical receivers. The present invention comprises a signal processing device including a plurality of chromatic dispersion equalizers and a multiple-input multiple-output equalizer, wherein the chromatic dispersion equalizers are configured to receive and equalize signals provided by the multiple-input multiple-output equalizer. Moreover, the present invention relates to a corresponding signal processing method.

BACKGROUND OF THE INVENTION

Conventional coherent receivers in optical communication systems make use of channel equalizers to mitigate channel impairments. For example, equalizer stages can be implemented to provide a digital detector with the capability to correct channel impairments.

In this respect, modern optical communication systems can employ multi-phase multi-level signal alphabets and polarization division multiplexing (PDM) to carry high data rates with good spectral efficiency. In contrast to traditional direct demodulation, state-of-the-art coherent demodulation techniques map the impinging optical signal onto electrical signals potentially without any loss of information.

Signal processing in coherent optical receivers is customarily implemented in the equivalent complex baseband. The receiver front-end decomposes an arbitrary pair of orthogonal polarizations H and V into their in-phase (I) and quadrature (Q) components. The four resulting electrical signals HI, HQ, VI and VQ are sampled and passed to a digital processor that implements the detection algorithms.

Typical processing entails multiple stages for the mitigation of the transmission impairments. The group velocity dispersion (GVD) induced by chromatic dispersion (CD) in optic fibers can, for example, be compensated via a linear equalizer called bulk CD equalizer. Since CD acts independently of the polarization and is a quasi-static phenomenon, the bulk CD equalizers processes the H and V polarizations separately and it is generally sufficient to adjust the CD equalizers only at link set-up or in case of link reconfiguration.

By contrast, polarization dependent effects occurring in the optical fiber, such as for example polarization rotation, polarization mode dispersion (PMD) and polarization-dependent loss (PDL), are more dynamic in nature. These effects are conventionally compensated using a second linear equalizer, called multiple-input multiple-output (MIMO) equalizer, which processes jointly the H and V signals. Because of the dynamic nature of the polarization dependent effects, the MIMO equalizer can be continuously adapted to react to dynamically changing channel conditions.

Following the equalization stages, additional detection stages can include carrier frequency and phase recovery, which compensates the mismatch between transmit and receive lasers.

FIG. 1 shows a representation of digital signal processing device 100 included in a conventional coherent receiver.

The four electrical baseband tributaries (HI, HQ, VI, VQ) 110, 120, 130, 140 correspond to H and V polarizations of an optical signal, transmitted via an optical fiber, which have been received and converted to electrical baseband tributaries at the coherent receiver. In FIG. 1, the four electrical baseband tributaries (HI, HQ, VI, VQ) 110, 120, 130, 140 are sampled at Nyquist rate or faster by means of four analog-to-digital converters (ADCs) 150, 160, 170, 180. It follows that a timing misalignment (skew) among the electrical baseband tributaries (HI, HQ, VI, VQ) 110, 120, 130, 140 can arise as a consequence of imbalances in the analog paths, such as for example in the analog-to-digital converters (ADCs) 150, 160, 170, 180. The sampled signals are forwarded to configurable delays 190, 200, 210, 220, described in more detail below, and the I and Q components of both polarization planes are logically gathered in two complex signals corresponding to H and V in the equivalent complex baseband. In FIG. 1, the step of gathering the I and Q components of each polarization plane is symbolized by having multiplier blocks 230, 240 perform multiplication of the Q components by the imaginary unit j, and by a subsequent addition of the respective real and imaginary parts.

Then, each polarization plane of the complex baseband signal is passed through a complex-valued single-input single-output (SISO) bulk CD equalizer 250, 260. Here, the bulk CD equalizer 250, 260 typically corresponds to a long linear finite impulse response (FIR) filter, for example with up to 4000 complex coefficients. Due to complexity reasons, the bulk CD equalizer 250, 260 FIR filter can be implemented in the frequency domain.

Both polarization signals provided by the bulk CD equalizers 250, 260 are then jointly processed by a MIMO equalizer 270. In this example, the MIMO equalizer 270 includes a 2×2 FIR decimating filter with up to ~40 taps (time delays) with adaptive complex coefficients. At the outputs of the MIMO equalizer 270, two complex signals are provided with one sample per symbol. The MIMO equalizer 270 is typically realized in the time domain, although an equivalent frequency-domain implementation can also be used.

In the example shown in FIG. 1, a carrier recovery block 280 computes and applies a phase correction to the signals provided by the MIMO equalizer 270. The phase corrected H and V signals 290, 300 are subsequently de-mapped in a demapper 310 to hard-decided bits in case of hard-decision forward error correction (FEC), or soft bit metrics in case of soft-decision FEC. The output of the demapper 310 can then be provided to a channel decoder 320 for further processing.

FIG. 1 shows a conventional solution for the blind adaptation (without dedicated training symbols) of the MIMO equalizer 270. In this scheme, mismatch errors are estimated in mismatch error estimation blocks 330, 340, 350, 360 based on signals provided by the MIMO equalizer 270, either before or after the carrier recovery 280 has processed the signals. The estimated mismatch errors are then used to adapt the coefficients of the MIMO equalizer 270. For this purpose, selection blocks 370, 380 can be provided to select or merge signals for adapting the coefficients of the MIMO equalizer 270 based on the mismatch errors provided by the mismatch error estimation blocks 330, 340, 350, 360. In the example shown in FIG. 1, the mismatch errors received by the selection blocks 370, 380 can be preprocessed in phase shifting complex conjugating blocks 390, 400.

Typical error criteria derived before phase correction (within the mismatch error estimation blocks 330, 340 shown in FIG. 1) are the stop-and-go algorithm, the constant modulus algorithm (CMA) or modifications thereof. After phase correction, the mismatch is computed (within the mismatch error estimation blocks 350, 360 shown in FIG. 1) as the difference between the received samples and the next valid respective constellation symbols, which is known as decision-directed least-mean-square (DD-LMS) algorithm; in this case the error is counter-rotated (within the blocks 390, 400) by the opposite of the carrier phase correction before being passed to the equalizer.

In some implementations, the receiver can initially rely upon an error computed before the carrier recovery, before it switches to a more accurate criterion derived after the phase correction as soon as the carrier recovery converges.

As mentioned above, a timing misalignment (skew) among the electrical baseband tributaries (HI, HQ, VI, VQ) 110, 120, 130, 140 can arise as a consequence of imbalances in the analog paths, such as for example in the analog-to-digital converters (ADCs) 150, 16, 170, 180. Such imperfections in the analog front-end and in the sampling devices 150, 16, 170, 180 impair the quality of the complex baseband signals. In particular, imbalances in the length of the receiver paths result in timing misalignments (skew) between HI and HQ or VI and VQ, which can severely degrade the performance of the receiver when using high-order modulation formats. Skew between homologous H and V components is less critical because it is akin in its effect to polarization mode dispersion (PMD) and can thus be seamlessly compensated by the MIMO equalizer 270.

Figure 2:
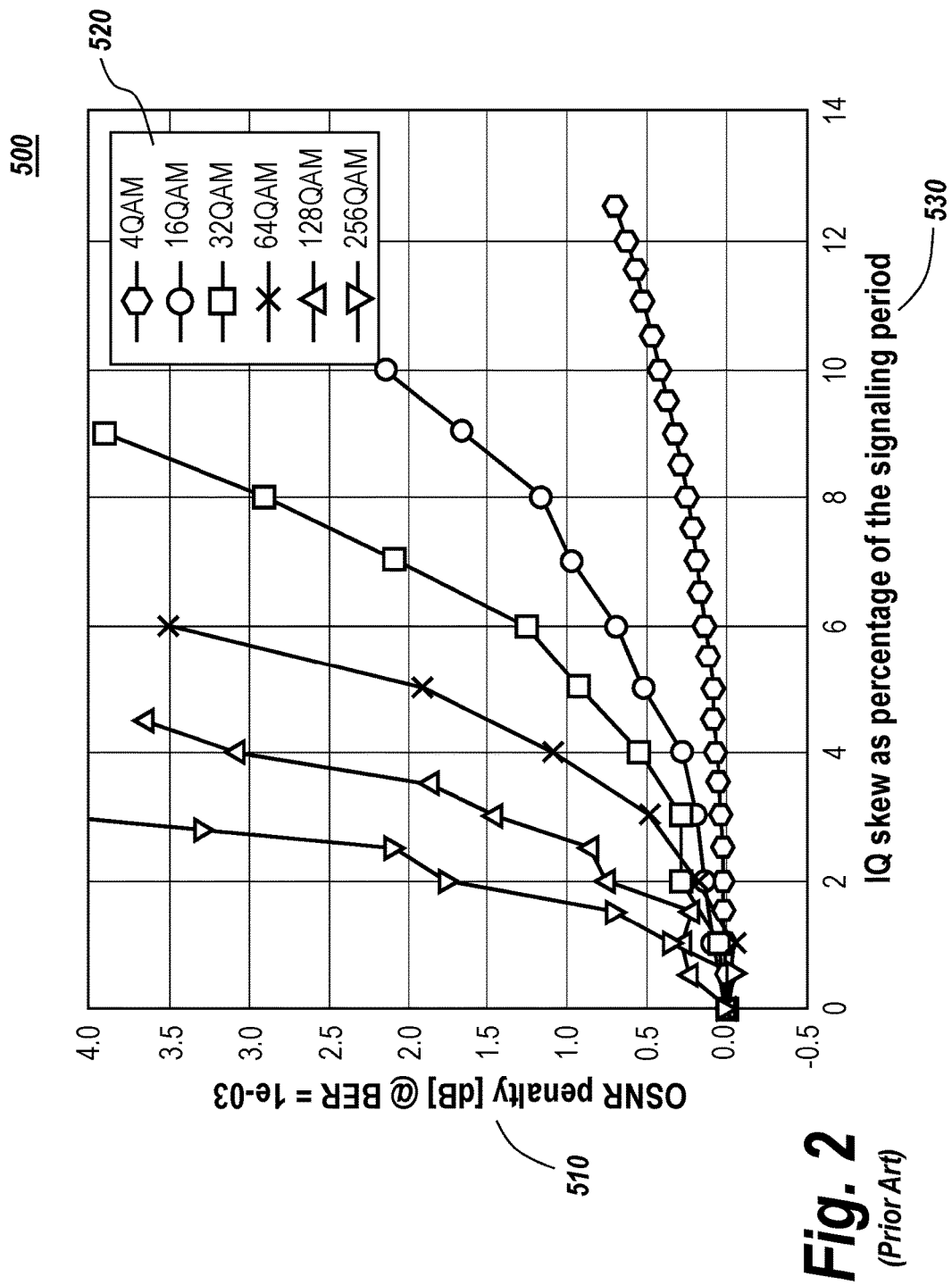

FIG. 2 shows a penalty chart 500, wherein the penalty caused by the above timing misalignment (skew) is illustrated in terms of optical signal-to-noise ratio (OSNR) 510 for several m-ary quadrature amplitude modulation (mQAM) formats 520 (at a bit-error rate (BER) of $10^{-3}$) as a function of a normalized IQ-skew 530. The penalty indicates the increase of OSNR required to keep the BER at a defined level ($10^{-3}$ in the example) due to the signal distortions as compared with undistorted signals. For example, in order to stay below a maximum penalty of 0.5 dB, the skew must be maintained below 11%, 5% and 3% of the signaling period for the illustrated 4QAM, 16QAM and 64QAM modulation formats, respectively. This represents a challenging requirement at typical signaling rates of 30-35 GHz for any constellations larger than 4QAM. Additionally, the emerging trend towards higher symbol rates is going to exacerbate the problem.

A precise design of the analog circuitry can suffice to maintain the IQ skew below certain thresholds, and can, for example, provide a feasible solution for PDM-4QAM systems running at an information bit rate of ~100 Gb/s. However, such precision dependent analog circuitry design becomes increasingly prohibitive as the constellation size and the signaling rate grow. Moreover, it is difficult, if not impossible, to predict skew effects arising in such ADCs, which further complicates the analog circuitry design, and can even prevent the appropriate dimensioning of strip lines on the printed circuit board.

A different state-of-the-art approach aims at mitigating the problem using a calibration procedure. Digital samples are captured directly after the ADCs 15, 160, 170, 180 shown in FIG. 1 and are used to measure the skew. Then, the programmable delays 190, 200, 210, 220 are adjusted accordingly in order to compensate for the timing misalignment. In this approach, the configurable delays 190, 200, 210, 220 must be able to shift the digital signal by fractions of the sampling period, for example by interpolating between the samples. A significant disadvantage of this approach is that the respective calibration routine can be time-consuming and dedicated components (capture facility after the ADCs and configurable fractional delays) are required, which increases the complexity of the circuit and digital processor, and also increases the related power consumption. Further, this approach provides a fixed, non-adaptive, compensation, which can be inadequate for many demanding modulation formats. For example, if the skew of the analog circuitry is time-varying, e.g. because of temperature effects, and/or the skew of the ADCs can change at each power cycle, an adaptive compensation is preferred.

Figure 3:
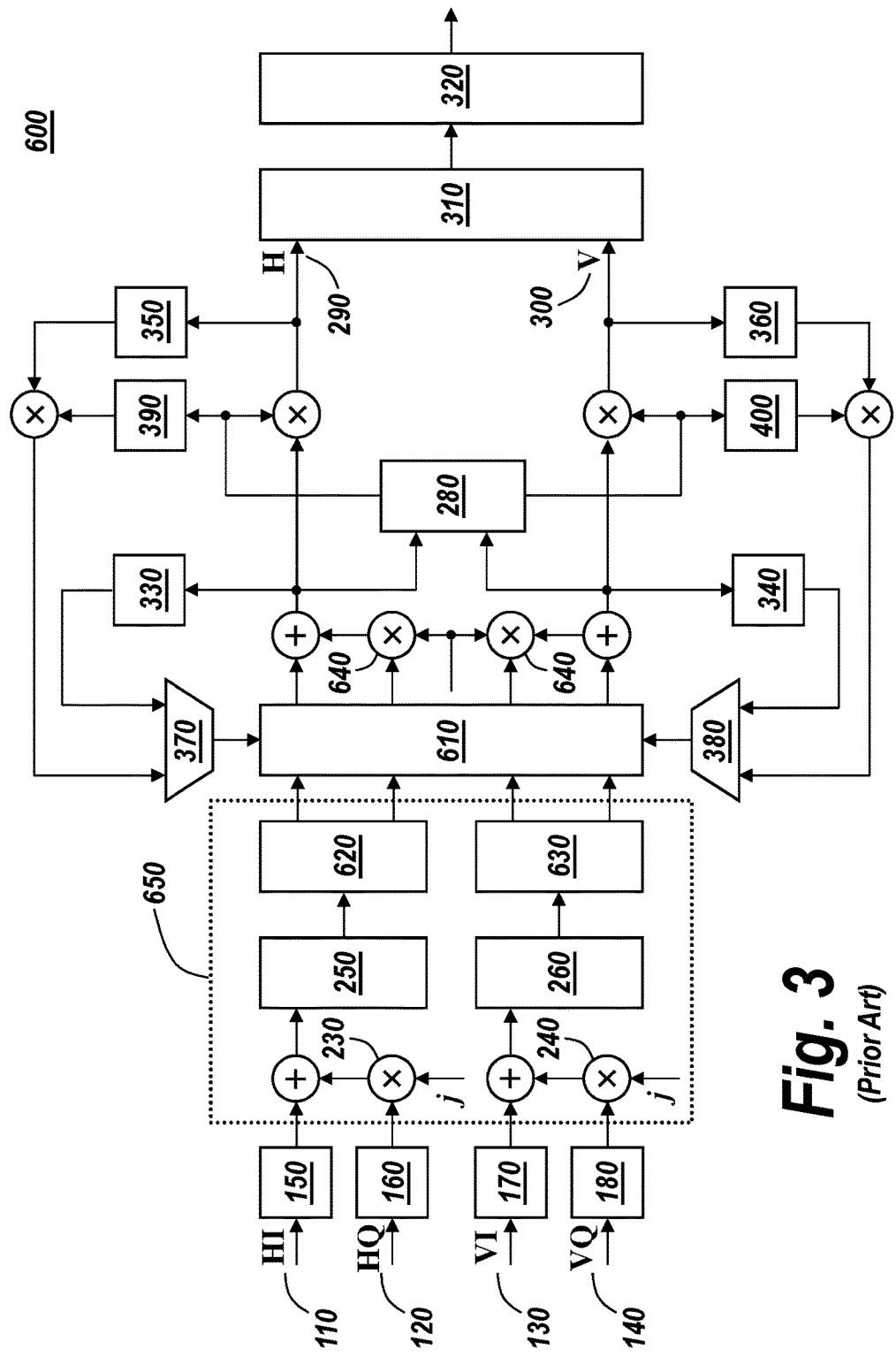

The paper "Compensation for In-Phase/Quadrature Imbalance in Coherent-Receiver Front End for Optical Quadrature Amplitude Modulation" by Md. S. Faruk and K. Kikuchi, IEEE Photonics Journal, volume 5, Number 2, April 2013, shows that the MIMO equalizer in the digital signal processing device 600 can be modified as shown in FIG. 3 to adjust any imbalance, including skew, between the I and Q channels. For this purpose, the paper proposes replacing each of four complex-valued FIR filters included within the complex-valued 2×2 MIMO equalizer 270 shown in FIG. 1 with a 2×2 real-valued MIMO equalizer. As a result, the standard complex 2×2 MIMO equalizer 270 is replaced by a real 4×4 MIMO equalizer 610 as shown in FIG. 3, which has separate ports for HI, HQ, VI and VQ signal components provided by Re/Im splitting blocks 620, 630. Differently from a complex equalizer, a real equalizer processes the real and imaginary parts of H and V as distinct signals and can delay them by different time offsets, thereby correcting IQ skew. As shown in FIG. 3, the so filtered real and imaginary parts of each polarization plane are symbolized conceptually for illustration purposes by having multiplier blocks 640 multiply the respective Q components by the imaginary unit j and the subsequent addition of the respective real and imaginary parts. The paper by Faruk and Kikuchi states that any standard adaptation algorithm can be adopted to update the coefficients of the real MIMO equalizer, and the DD-LMS algorithm is further demonstrated in the paper. Also in this respect, since a complex multiplication requires (in a typical realization) four real multiplications and two real additions, the computational burden of a real 4×4 filter is equivalent in terms of the underlying real arithmetic to that of a complex 2×2 filter.

The paper "Blind Equalization of Receiver In-Phase/Quadrature Skew in the Presence of Nyquist Filtering" by M. Paskov, D. Lavery and S. J. Savory, IEEE Photonics Technology Letters, volume 25, number 24 on Dec. 15, 2013, follows a similar approach as proposed by Faruk and Kikuchi, see discussion above and FIG. 3, but suggests computing the error criterion used for MIMO equalizer 610 adaptation before the carrier recovery, adopting the constant modulus algorithm (CMA) for 4QAM and a radially directed equalizer algorithm for higher order QAM.

The limitations of the above approaches proposed by Faruk and Kikuchi and by Paskov, Lavery and Savory are discussed in the following two papers authored by R. Rios-Müller, J. Renaudier and G. Charlet: "Blind Receiver Skew Compensation for Long-Haul Non-Dispersion Managed Systems", European Conference on Optical Communications in Cannes, France, September 2014 and "Blind Receiver Skew Compensation and Estimation for Long-Haul Non-Dispersion Managed Systems Using Adaptive Equalizer", Journal of Lightwave Technology, volume 33, number 7, April 2015. As explained in these papers, the receiver of FIG. 3 can effectively correct IQ skew arising in the receiver front-end only in the back-to-back configuration. In other words, as soon as the signal is transmitted over an optical link, it experiences GVD that must be compensated in the bulk CD equalizer. In this case, the complex coefficients of the bulk CD equalizers 250, 260 shown in FIG. 3 mix the I and Q components on each polarization plane. It follows that the subsequent real 4×4 MIMO equalizer 610 is prevented from accessing and delaying independently the I and Q components on each polarization plane.

From a mathematical perspective, unifying the bulk CD equalizers 250, 260 and the MIMO equalizer 610 in a single bulk CD MIMO equalization stage seems to provide a feasible solution. In FIG. 3, this corresponds to the removal of the blocks enclosed in the dashed rectangle 650. However, merging both equalization stages into one stage requires the implementation of an adaptive MIMO equalizer including 500-4000 (instead of 1-40) taps, which is impractical. On the one side, the adaptation of such a large number of tap coefficients runs into huge convergence difficulties; and on the other side, the use of a 4×4 bulk CD MIMO equalizer results in double complexity with respect to the state-of-the-art solution having two complex 1×1 bulk CD equalizers.

Figure 4:
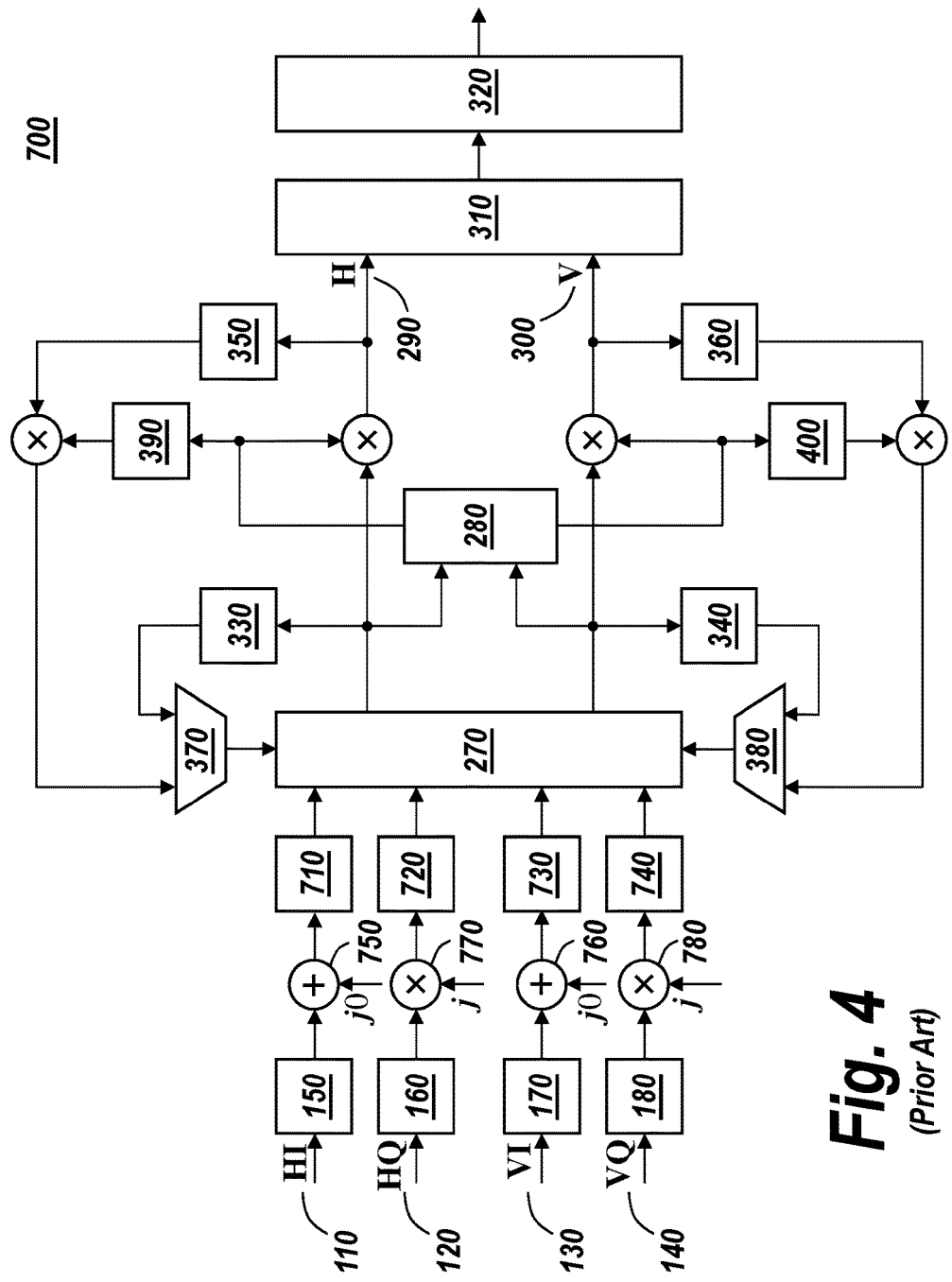

In view of this, Rios-Müller, Renaudier and Charlet propose a different digital signal processing device 700 as illustrated in FIG. 4. The tributaries (HI, HQ, VI, VQ) 110, 120, 130, 140 are separately processed by four bulk CD equalizers 710, 720, 730, 740 with complex coefficients. In FIG. 4 a zero imaginary part is added 750, 760 to each I tributary and the Q tributaries are multiplied 770, 780 by the imaginary unit to indicate for illustration purposes that they are interpreted and processed as a complex signal. Each output of a bulk CD equalizer 710, 720, 730, 740 is complex but contains contributions from only one tributary. Differently from the digital signal processing device 600 shown in FIG. 3, the complex MIMO equalizer 790 shown in FIG. 4 can delay the tributaries independently and correct a relative timing misalignment also in the presence of GVD. The implementation of the four bulk CD equalizers 710, 720, 730, 740 can be simplified by exploiting the fact that the imaginary part of their input is zero. In fact, it is easy to prove that the four bulk CD equalizers 710, 720, 730, 740 of FIG. 4 require approximately as many computations as the two bulk CD equalizers 250, 260, 620, 630 shown in FIG. 1 or FIG. 3.

However, a significant disadvantage of the arrangement shown in FIG. 4 is that the complex 4×2 MIMO equalizer 790 requires twice as many computations as the standard complex 2×2 MIMO equalizer 270 of FIG. 1 or the real 4×4 MIMO equalizer 610 of FIG. 3.

SUMMARY OF THE INVENTION

Accordingly, a problem underlying the present invention is to provide improved devices and methods to allow compensating timing misalignments among signals. The signals may in particular correspond to electrical baseband tributaries (HI, HQ, VI, VQ) and the timing misalignment may arise as a consequence of imbalances in analog paths, such as for example in the analog-to-digital converters of an optical coherent receiver.

The signal processing device according to the present invention comprises a multiple-input multiple-output (MIMO) equalizer configured to receive and equalize a plurality of real value signals, wherein the real value signals correspond to signals or signal components received by an optical receiver. The outputs of the MIMO equalizer provide equalized real or imaginary components of complex signals. More specifically, the outputs of the MIMO equalizer provide signal components which are the equivalents of Real (Re) and Imaginary (Im) parts of complex signals (Re+Im·j). In an example, the MIMO equalizer receives four real value signals from analog to digital converters and provides at its outputs two real components and two imaginary components of two complex signals. Here, the real value signals received by the MIMO equalizer can correspond to in-phase (I) or quadrature components (Q) of a quadrature amplitude modulated (QAM) signals, wherein each quadrature amplitude modulated (QAM) signal can correspond to a corresponding one of two orthogonally polarized signal components, such as for example to a vertically or a horizontally polarized signal (V, H). As a result, the MIMO equalizer is configured to provide equalized real and imaginary components of two complex signals. In an example, the MIMO equalizer includes a 4×4 real FIR decimating filter including, for example, up to ~40 taps (time delays). The MIMO equalizer can be realized in the time domain, although an equivalent frequency-domain implementation can also be used.

Across this document, QAM stands for all modulation formats whose symbol constellation can be represented by the linear superposition of two orthogonal components. The case that one of the components vanishes is also included. Thus, it also comprises modulation formats such as binary phase shift keying (BPSK).

The MIMO equalizer can, for example, be configured to compensate polarization rotation, polarization mode dispersion (PMD) and/or polarization-dependent loss (PDL). In an example, the MIMO equalizer includes a plurality of linear filters, in particular a plurality of single-input single-output finite impulse response filters, wherein each of the filters is coupled to an input of the MIMO equalizer, and wherein the outputs of the MIMO equalizer are provided by adding outputs of the single-input single-output finite impulse response filters.

The signal processing device according to the present invention further comprises a plurality of chromatic dispersion (CD) equalizers, wherein each CD equalizer is configured to receive and equalize one of said complex signals including the equalized real and imaginary components provided by the MIMO equalizer. In the above example, wherein the multiple-input multiple output equalizer receives four real value signals and provides four real and imaginary components of two complex signals, two CD equalizers can be adapted to receive and equalize the respective two complex signals.

As discussed above, a CD equalizer can, for example, be used to compensate group velocity dispersion (GVD) induced by chromatic dispersion in optical fibers. For this purpose, a CD equalizer can be implemented as a linear equalizer, also called bulk CD equalizer, for example as a linear finite impulse response (FIR) filter. Such an FIR filter can, for example, include up to 4000 complex coefficients. In an example, at least one of the CD equalizers includes a single-input single-output finite impulse response filter having a larger number of filter coefficients than the single-input single-output finite impulse response filters of the MIMO equalizer.

As mentioned above, chromatic dispersion acts independently of polarization and behaves in a quasi-static manner.

Thus, it is generally sufficient to configure and/or adjust the coefficients of the CD equalizers only at link set-up or in case of link reconfiguration.

It follows according to the present invention that a MIMO equalizer is arranged to equalize a plurality of real value signals, such as for example the HI, HQ, VI and VQ components of a signal received by a receiver. Thus, the MIMO equalizer has individual access to the HI, HQ, VI and VQ components before they are mixed, and also before the CD equalizers process the incoming signal. This guarantees that the MIMO equalizer can correct a time misalignment independently of the setting of the CD equalizers. Thus, in an example, the MIMO equalizer is configured to compensate time misalignment among sampling devices, wherein the sampling devices provide the signals received by the MIMO equalizer.

In an example, the signal processing device further includes a carrier recovery module coupled to receive the two signals provided by the above two CD equalizers. Thus, following the equalization stages, additional detection stages can be implemented to include, for example, carrier frequency and phase recovery, for example to compensate the mismatch between transmit and receive lasers.

As mentioned above, the MIMO equalizer can, for example, be configured to compensate polarization dependent effects. In an example, the MIMO equalizer can include adaptive filters having adjustable filter coefficients. In this way, the MIMO equalizer can be continuously adapted to react to dynamically changing channel conditions.

In an example, input or output signals of the carrier recovery module are used to adjust the filter coefficients of the MIMO equalizer. In this respect, the signal at the output of the MIMO equalizer has not yet been equalized to compensate chromatic dispersion, and can thus be affected by group velocity dispersion (GVD). It follows that the signal may not be suitable for adapting the MIMO equalizer. For this reason, dispersion compensated input or output signals of the carrier recovery module can be used to adjust the filter coefficients of the MIMO equalizer. In this way, the adaptation criterion can be based on signals which have been processed by the CD equalizer or, optionally, after the carrier recovery processing has been performed. As discussed in detail below, this arrangement can result in a long feedback path from the error computing back to the MIMO equalizer. However, since the MIMO equalizer needs to be only as fast as the polarization effects (for example 50-100 kHz), and considering the typical high optical data rates (30-40 GHz), the resulting delay has no practical effect on the performance of the adaptation loop. Also in this respect, the filter coefficients of the MIMO equalizer can, for example, be adjusted using a stop-and-go algorithm, a constant modulus algorithm, or a decision-directed least-mean-square (DD-LMS) algorithm.

The signal processing method according to the present invention comprises receiving and equalizing a plurality of real value signals using a MIMO equalizer, wherein the real value signals correspond to signals or signal components received by an optical receiver. As discussed above, the MIMO equalizer can, for example, be configured to compensate polarization rotation, polarization mode dispersion (PMD) and/or polarization-dependent loss (PDL). Moreover, in an example, the MIMO equalizer includes a plurality of linear filters, in particular a plurality of single-input single-output finite impulse response filters having the properties discussed above. In this way, the MIMO equalizer provides equalized real or imaginary components of complex signals at the outputs of the MIMO equalizer.

Then, each of said complex signals are equalized individually such as to compensate chromatic dispersion, wherein the complex signals include said equalized real and imaginary components. Thus, in an example, the MIMO equalizer is arranged to equalize a plurality of real value signals, such as for example the HI, HQ, VI and VQ components of a signal received by a receiver. It follows that the MIMO equalizer has individual access to process the HI, HQ, VI and VQ components before they are mixed, and in particular before the chromatic dispersion compensation. This guarantees that the MIMO equalizer can correct a time misalignment independently of the setting of a CD equalization procedure. Thus, in an example of the signal processing method, the respective receiving and equalizing the plurality of real signals using a MIMO equalizer includes compensating time misalignment among sampling devices, wherein the sampling devices provide the signals received and equalized by the MIMO equalizer.

In an example of the signal processing method, four signals are received and equalized by the MIMO equalizer such as to provide the real and imaginary components of two complex signals at four outputs of the MIMO equalizer.

In a further example, the four signals received and equalized by the MIMO equalizer are each being provided by an analog to digital converter, wherein each of the four signals corresponds to an in-phase or quadrature component of a quadrature amplitude modulated (QAM) signal, and wherein each quadrature amplitude modulated (QAM) signal corresponds to a corresponding one of two orthogonally polarized signal components, such as for example to a vertically or horizontally polarized signal.

According to the signal processing method, the two complex signals provided by the MIMO equalizer are equalized individually to compensate chromatic dispersion. Moreover, in an example, a carrier frequency and phase offset present in the equalized two complex signals can be recovered. In this respect, following the equalization stages, additional detection stages can be implemented to include, for example, carrier frequency and phase recovery, for example to compensate the mismatch between transmit and receive lasers.

The step of recovering a carrier in the two complex equalized signals can include providing a signal used for generating at least one error signal. Moreover, the filter coefficients of the MIMO equalizer can be adjusted based on the two complex equalized signals and/or based on the at least one error signal. In this way, the MIMO equalizer can be continuously adapted to react to dynamically changing channel conditions. For example, polarization dependent effects occurring in the optical fiber, such as for example polarization rotation, polarization mode dispersion (PMD) and polarization-dependent loss (PDL), are dynamic in nature. Such effects can be effectively compensated using a MIMO equalizer having adaptive filter coefficients. In an example, the filter coefficient of the MIMO equalizer can be adjusted using a stop-and-go algorithm, a constant modulus algorithm, or a decision-directed least-mean-square (DD-LMS) algorithm.

SHORT DESCRIPTION OF THE FIGURES

Figure 5:
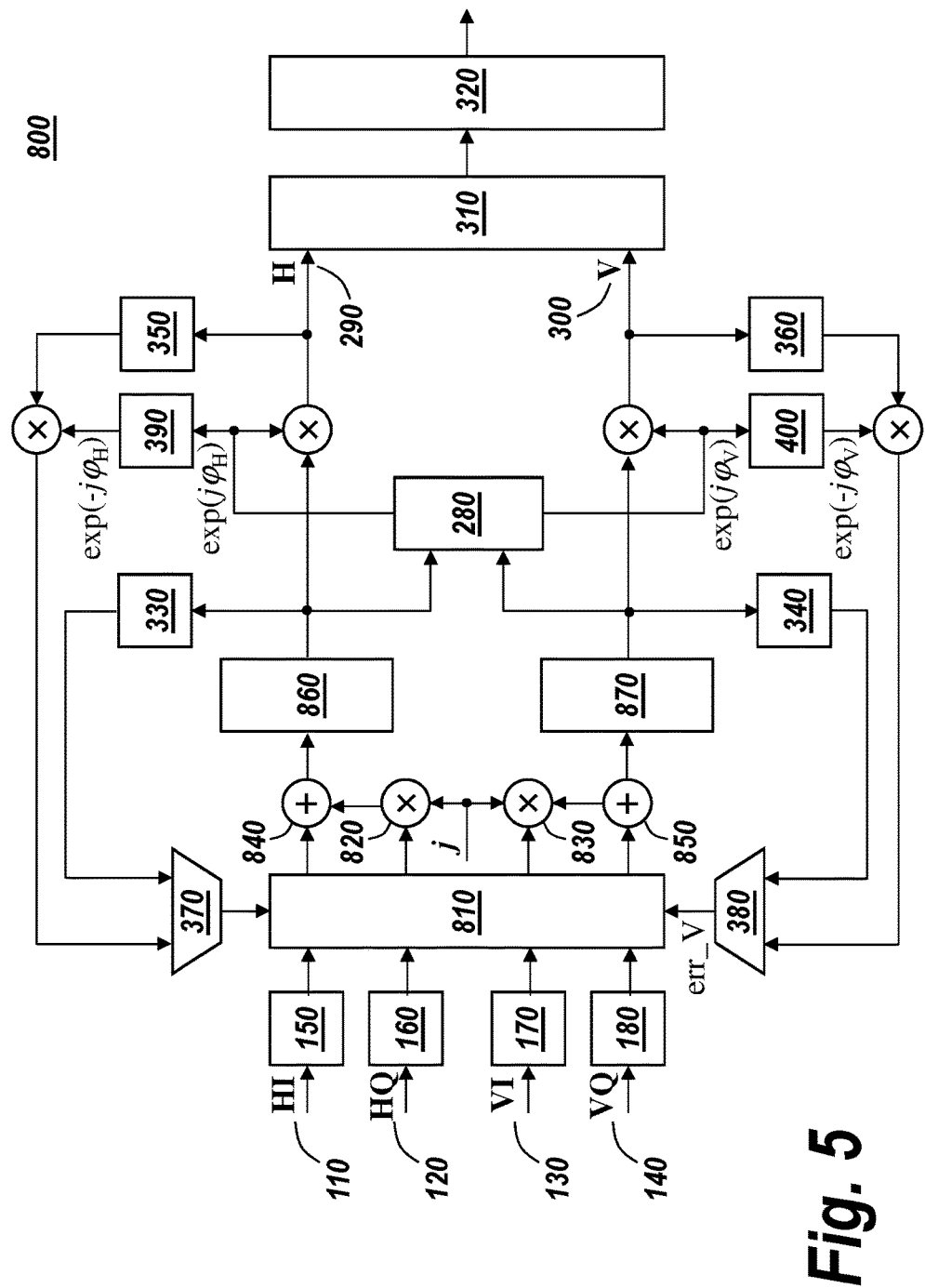
Figure 6:
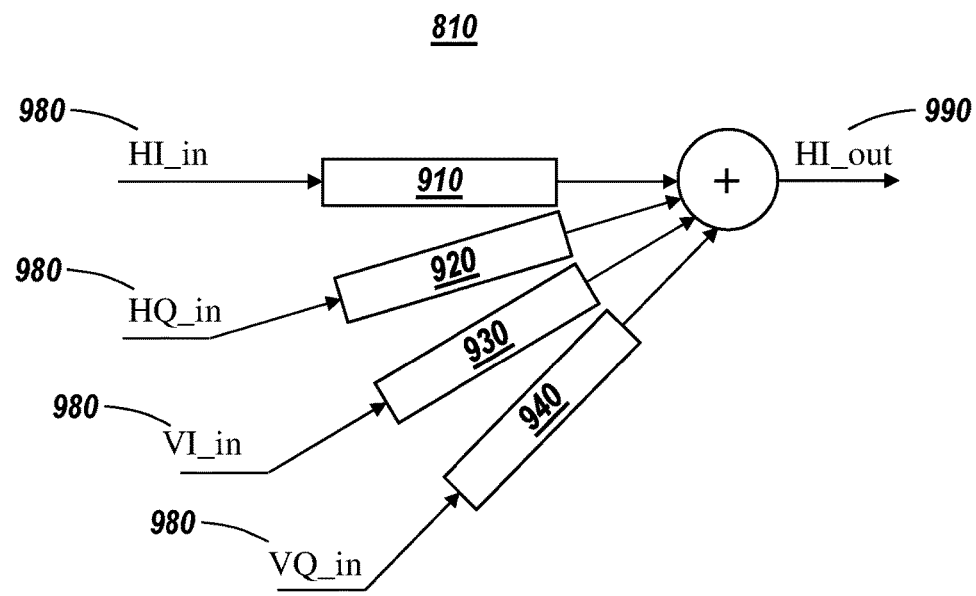
Figure 7:
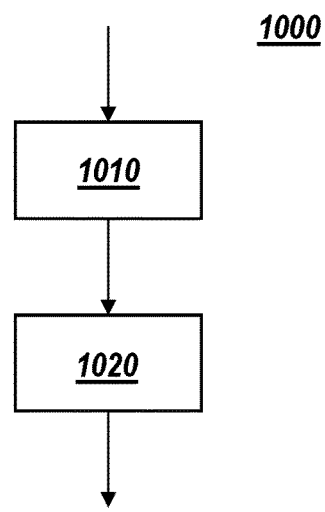

FIG. 1 illustrates a first example of a digital signal processing device included in a state-of-the-art coherent receiver, FIG. 2 illustrates the penalty caused by skews due to imperfections in analog front-end and sampling devices for several m-ary quadrature amplitude modulation (mQAM) formats, FIG. 3 illustrates a second example of a digital signal processing device included in a state-of-the-art coherent receiver, FIG. 4 illustrates a third example of a digital signal processing device included in a state-of-the-art coherent receiver, FIG. 5 illustrates a digital signal processing device according to the present invention, FIG. 6 illustrates four component filters contributing to the HI output of a MIMO equalizer, and FIG. 7 illustrates a signal processing method according to the present invention

DESCRIPTION OF THE PREFERRED EMBODIMENT

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated devices and method and such further applications of the principles of the invention as illustrated therein being contemplated therein as would normally occur now or in the future to one skilled in the art to which the invention relates.

FIGS. 1 to 4 provide background information and illustrate examples of digital signal processing devices according to the state-of-the-art; see discussion above.

FIG. 5 illustrates a digital signal processing device 800 according to an embodiment of the present invention. In this embodiment, the analog-to-digital converters 150, 160, 170, 180 convert four real tributaries HI, HQ, VI and VQ 110, 120, 130, 140 and pass the converted signals to a MIMO equalizer 810. Here, the MIMO equalizer 810 is implemented as a real 4×4 FIR filter having adaptive coefficients. The structure of the MIMO equalizer 810 is exemplified in FIG. 6, which shows four component filters 910, 920, 930, 940 each connected to an input 950, 960, 970, 980 of the MIMO equalizer 810, and each contributing to one of the outputs 990 of the MIMO equalizer 810. Although not illustrated in FIG. 6, the same filter structure can apply for generating the equalized signals at the remaining outputs of the MIMO equalizer 810. Thus, the computation of the HQ, VI and VQ outputs of the MIMO equalizer 810 is alike and is therefore not illustrated. Altogether the MIMO equalizer 810 shown in FIG. 5 consists of 16 real-valued SISO FIR filters and four 4-input adders and hence requires the same computation effort as a conventional complex 2×2 MIMO equalizer.

Each of the component filters 910, 920, 930, 940 can include an FIR filter, wherein each FIR filter can implement a different (frequency-dependent) scaling and delay. It follows that the respective filter structure can compensate, along PMD, PDL and filtering effects, also time misalignment (skew) among the input tributaries 950, 960, 970, 980. Hence, the capability to compensate for IQ skew is unaffected by the amount of bulk GVD, because the MIMO equalizer 810 accesses directly the received tributaries before they are mixed in the complex-valued bulk CD equalizers 860, 870.

More specifically, the MIMO equalizer 810 shown in FIG. 5 provides two real components and two imaginary components of two complex signals. The correspondence between real and complex signals is represented symbolically in FIG. 5 by the multiplication 820, 830 of the imaginary components by the imaginary unit j, and by the addition 840, 850 of the real and imaginary parts. In practice, of course, these operations may not require any computations and correspond merely to a logic re-interpretation of the physical signals.

The resulting two complex signals on the H and V polarizations are separately processed by two SISO bulk CD equalizers 860, 870 with complex coefficients. As explained above, the CD equalizers 860, 870 can have a large number of coefficients and may preferably be implemented in the frequency domain, for example by exploiting the efficiency of fast Fourier transforms. As also mentioned above, chromatic dispersion of a fiber generally behaves in a static manner, and the complex coefficients of the two SISO bulk CD equalizers 860, 870 are thus generally only computed at start-up of the digital signal processing device 800, or if a reconfiguration is triggered. In other words, the complex coefficients of the two SISO bulk CD equalizers 860, 870 are generally not updated during normal operation.

It follows that the digital signal processing device 800 according to the present invention includes the MIMO equalizer 810 in front of the CD equalizers 860, 870, where it has individual access to the HI, HQ, VI and VQ components before they are mixed. Moreover, by arranging the MIMO equalizer and CD equalizer in separate and subsequent equalizer stages, it is guaranteed that the MIMO equalizer can correct a time misalignment (skew) independently of the setting of the CD equalizers. Further, by arranging the MIMO equalizer 810 in accordance with the present invention, the MIMO equalizer can be implemented as a real 4×4 FIR adaptive filter, thus requiring significantly lower computational effort than the complex 4×2 filter proposed by Müller, Renaudier and Charlet; see discussion above in connection with FIG. 4.

In FIG. 5, the signals provided by the CD equalizers 860, 870 are forwarded to the carrier recovery block 280, which provides phase corrections of the carrier included in the equalized signal. In this example, the phase corrections are illustrated in FIG. 5 in form of complex exponentials exp (j$\varphi_H$) and exp(j$\varphi_V$). Then, after performing the phase corrections by suitable phase rotators or complex multipliers, the H and V signals are passed to the bit demapper 310, which calculates preliminary bit decisions or bit metrics and passes them to the decoder 320. The functional and implementation aspects of the carrier recovery block 280, demapper 310 and decoder 320 are discussed in detail above.

In the digital signal processing device 800 shown in FIG. 5, the signal at the output of the MIMO equalizer 810 has not yet been equalized to compensate chromatic dispersion, and may thus be affected by group velocity dispersion (GVD). It follows that this signal may not be suited for computing error criteria, such as for example to adapt the filter coefficients of the MIMO equalizer 810 in response to changing channel characteristics. For this reason, FIG. 5 shows that the adaptation criterion is based on signals which have been processed by the CD equalizers 860, 870 or, optionally, by the carrier recovery block 280. This results into a longer feedback path from the error computations back to the MIMO equalizer 810. However, since the MIMO equalizer needs to be only as fast as the polarization effects (i.e. maximally 50-100 kHz), and considering the very high optical data rates (30-40 GHz), the resulting delay has no practical effect on the performance of the adaptation loop. Also in this respect, although the CD equalizers 860, 870 can include long FIR filters causing a latency of a few thousand symbols, this does not represent a problem in practice, in particular because of the disproportion between the signaling rate and the variation rate of the optical channel. For example, where the latency of the bulk CD equalizers 860, 870 causes a lag of a few tens of nanoseconds in the reaction time of the MIMO equalizer 810, the time scale of the channel variations lies in the range of hundreds of milliseconds. It follows that the above adaptation of the MIMO equalizer 810 filter coefficients is fully capable of coping with the dynamics of the optical channel.

In other words, in order to prevent the MIMO equalizer 810 from attempting to correct GVD, the digital signal processing device 800 according to the present invention derives the error used as adaptation criterion after the bulk CD equalizers 860, 870, thereby making the GVD transparent to the adaptation mechanism. In this way, the GVD is already corrected in the CD equalizers 860, 870 and therefore need not be compensated a second time. Moreover, compensating GVD after a typical link using a MIMO equalizer 810 can easily overwhelm the capacity of the MIMO equalizer 810, in particular due to its comparatively small number of taps.

In case of a difference between the actual dispersion experienced by the signal and the amount of dispersion compensated by the bulk equalizer, part of the dispersion might be compensated by the MIMO equalizer. In an example, this portion is below 1%, in a further example, it amounts to 10% at maximum.

As mentioned above, the adaptation of the MIMO equalizer 810 filter coefficients can, for example, employ a rotationally invariant error criterion (CMA, stop-and-go algorithm, etc.) before applying the carrier phase correction, or the DD-LMS algorithm after the phase correction once carrier recovery has converged. In the latter case, the respective errors must be counter-rotated by the complex exponentials $\exp(-j\varphi H)$ and $\exp(-j\varphi V)$, which has the effect of canceling the phase corrections, and thus decouples the equalizer adaptation from the carrier recovery.

FIG. 7 shows a corresponding signal processing method 1000 comprising the step of receiving and equalizing a plurality of real value signals using a MIMO equalizer 810, wherein the outputs of the MIMO equalizer 810 correspond to complex signals which are subsequently and individually equalized in step 1020 to compensate chromatic dispersion. In other words, the MIMO equalizer 810 provides in step 1010 equalized real or imaginary components of complex signals at its outputs, and the respective complex signals are then subsequently and individually equalized to compensate chromatic dispersion.

In this way, and as discussed in detail above, by performing the MIMO equalization and CD equalization in separate and subsequent equalization steps, it is guaranteed that the MIMO equalization can correct a time misalignment (skew) independently of the CD equalization. Further, as explained above, by arranging the equalization processing steps in accordance with FIG. 7, a MIMO equalizer can be implemented as a real FIR adaptive filter, thus reducing the computational burden in comparison with the complex filter proposed by Müller, Renaudier and Charlet, illustrated in FIG. 4.

Hence, the digital signal processing device 800 and signal processing method 1000 according to the present invention allow to efficiently compensate timing misalignments among signals, in particular when the signals correspond to electrical baseband tributaries (HI, HQ, VI, VQ) and when the timing misalignment arises as a consequence of imbalances in the analog paths or in the analog-to-digital converters of optical coherent receivers.

LIST OF REFERENCE SIGNS 100, 600, digital signal processing device
700, 800
110, 120, electrical baseband tributaries
130, 140
150, 160, analog-to-digital converters
170, 180
190, 200, configurable delays
210, 220
230, 240, multiplier blocks
640,
820, 830,
770, 780
250, 260, chromatic dispersion (CD) equalizers
620, 630,
710, 720,
730, 740,
860, 870
270, 610, multiple-input multiple-output (MIMO) equalizers
790, 810
280 carrier recovery block
290, 300 phase corrected H and V signals
310 demapper
320 channel decoder
330, 340, mismatch error estimation blocks
350, 360
370, 380 selection blocks
390, 400 phase shift complex conjugating blocks
500 penalty chart
510 optical signal-to-noise ratio (OSNR)
520 m-ary quadrature amplitude modulation (mQAM) formats
530 normalized IQ-skew
620, 630 Re/Im splitting blocks
650 removed blocks
750, 760 adding operation
840, 850
910, 920, component filters
930, 940
950, 960 inputs of MIMO equalizer
970, 980
990 output of MIMO equalizer
1000 signal processing method
1010 method step of receiving and MIMO equalizing real value signals
1020 method step of individually CD equalizing complex signals

The invention claimed is:

1. A signal processing device, comprising:
a multiple-input multiple-output equalizer configured to receive and equalize a plurality of real value signals corresponding to signals or signal components received by an optical a coherent receiver, wherein outputs of the multiple-input multiple-output equalizer provide equalized real or imaginary components of complex signals; and
a plurality of chromatic dispersion equalizers, wherein each chromatic dispersion equalizer is configured to receive and equalize one of said complex signals provided by the multiple-input multiple-output equalizer.

2. The signal processing device according to claim 1, wherein said multiple-input multiple-output equalizer receives four real value signals from analog to digital converters and provides at its outputs two real components and two imaginary components of two complex signals, wherein two chromatic dispersion equalizers are configured to receive and equalize said two complex signals, and wherein the real value signals received by the multiple-input multiple-output equalizer correspond to in-phase or quadrature components of a corresponding quadrature amplitude modulated (QAM) signal, and wherein QAM signals corresponds to a corresponding one of two orthogonally polarized signal components.

3. The signal processing device according to claim 1, further comprising a carrier recovery module coupled to receive the two equalized complex signals provided by the two chromatic dispersion equalizers.

4. The signal processing device according to claim 1 wherein the multiple-input multiple-output equalizer is configured to compensate time misalignment among sampling devices, wherein the sampling devices provide the signals received by the multiple-input multiple-output equalizer.

5. The signal processing device according to claim 1, wherein the multiple-input multiple-output equalizer includes a plurality of single-input single-output finite impulse response filters each coupled to an input of the multiple-input multiple-output equalizer, and wherein the outputs of the multiple-input multiple-output equalizer correspond to added outputs of said single-input single-output finite impulse response filters.

6. The signal processing device according to claim 3, wherein the multiple-input multiple-output equalizer includes adaptive filters having adjustable filter coefficients.

7. The signal processing device according to claim 5, wherein at least one of the chromatic dispersion equalizers includes a single-input single-output finite impulse response filter having a larger number of time delays than the single-input single-output finite impulse response filters of the multiple-input multiple-output equalizer.

8. The signal processing device according to claim 6, wherein output signals of the chromatic dispersion equalizers or output signals of the carrier recovery module are used to adjust the filter coefficients of the multiple-input multiple-output equalizer.

9. The signal processing device according to claim 8, wherein the filter coefficients of the multiple-input multiple-output equalizer are determined using a stop-and-go algorithm, a constant modulus algorithm, or a decision-directed least-mean-square (DD-LMS) algorithm.

10. A signal processing method, comprising:
receiving and equalizing a plurality of real value signals corresponding to signals or signal components received by an optical a coherent receiver, wherein the real value signals are received and equalized using a multiple-input multiple-output equalizer such as to provide equalized real or imaginary components of complex signals at the outputs of the multiple-input multiple-output equalizer; and individually equalizing each of said complex signals to compensate chromatic dispersion.

11. The method according to claim 10, wherein four signals are received and equalized by the multiple-input multiple output equalizer such as to provide two real components and two imaginary components of two complex signals at four outputs of the multiple-input multiple-output equalizer, wherein the four signals received and equalized by the multiple-input multiple output equalizer are each provided by an analog to digital converter, wherein each of the four signals corresponds to an in-phase or quadrature component of a corresponding quadrature amplitude modulated (QAM) signal, and wherein each of the QAM signals corresponds to a corresponding one of two orthogonally polarized optical signal components.

12. The method according to claim 10, wherein receiving and equalizing the plurality of real signals using a multiple-input multiple-output equalizer includes compensating time misalignment among sampling devices, wherein the sampling devices provide the signals received and equalized by the multiple-input multiple-output equalizer.

13. The method according to claim 11, wherein the two complex signals provided by the multiple-input multiple-output equalizer are individually equalized to compensate chromatic dispersion, and wherein a carrier frequency and phase offset present in the chromatic dispersion equalized two complex signals is recovered by phase correction.

14. The method according to claim 13, wherein recovering of a carrier in the two chromatic dispersion equalized complex signals includes providing a signal for generating at least one error signal, and wherein filter coefficients of the multiple-input multiple-output equalizer are adjusted based on the two complex chromatic dispersion equalized signals and/or based on the at least one error signal.

15. The method according to claim 14, wherein filter coefficients of the multiple-input multiple-output equalizer are adjusted using a stop-and-go algorithm, a constant modulus algorithm, or a decision-directed least-mean-square (DD-LMS) algorithm.

* * * * *